United States Patent
Marks et al.

(10) Patent No.: US 10,664,654 B2
(45) Date of Patent: May 26, 2020

(54) ELECTRONIC DOCUMENT AUTHOR IDENTIFICATION

(71) Applicant: WORKIVA INC., Ames, IA (US)

(72) Inventors: Bryon Lee Marks, Huxley, IA (US); Robert Matthew Crawford, Ames, IA (US); Levi Nichols, Ankeny, IA (US); Edward Cupps, Nevada, IA (US); Hannah Deering, Ames, IA (US)

(73) Assignee: WORKIVA INC., Ames, IA (US)

( * ) Notice: Subject to any disclaimer, the term of this patent is extended or adjusted under 35 U.S.C. 154(b) by 131 days.

(21) Appl. No.: 15/696,439

(22) Filed: Sep. 6, 2017

(65) Prior Publication Data

US 2018/0075005 A1 Mar. 15, 2018

Related U.S. Application Data

(60) Provisional application No. 62/393,791, filed on Sep. 13, 2016.

(51) Int. Cl.
| | |
|---|---|
| *G06F 40/197* | (2020.01) |
| *G06F 40/177* | (2020.01) |
| *G06F 40/166* | (2020.01) |
| *G06F 40/131* | (2020.01) |
| *G06F 16/93* | (2019.01) |

(Continued)

(52) U.S. Cl.
CPC ........... *G06F 40/197* (2020.01); *G06F 16/93* (2019.01); *G06F 16/955* (2019.01); *G06F 40/131* (2020.01); *G06F 40/166* (2020.01); *G06F 40/177* (2020.01); *G06F 3/0481* (2013.01)

(58) Field of Classification Search
CPC ...... G06F 17/2288; G06F 17/241; G09G 5/02
See application file for complete search history.

(56) References Cited

U.S. PATENT DOCUMENTS

| | | | |
|---|---|---|---|
| 7,797,226 B2 | 9/2010 | Ram et al. | |
| 8,307,119 B2 | 11/2012 | Rochelle et al. | |
| 8,656,270 B2 | 2/2014 | Rui et al. | |

(Continued)

OTHER PUBLICATIONS

Google, Google Sheets, retrieved from internet at <https://www.google.com/sheets/about/> on Sep. 5, 2017, 7 pages.

(Continued)

*Primary Examiner* — Stephen S Hong
*Assistant Examiner* — Nicholas Hasty
(74) *Attorney, Agent, or Firm* — Faegre Drinker Biddle Reath LLP

(57) ABSTRACT

A method on a client device is described. First document content information that corresponds to a first plurality of document elements of an electronic document is received from a data server. A graphical user interface that represents the first plurality of document elements is generated based on the first document content information. First author identifiers that indicate most recent authors for the first plurality of document elements are received. The first document content information and the first author identifiers correspond to a first timestamp. Visual identifiers for the first author identifiers are selected based on the graphical user interface. The visual identifiers are generated to indicate which of the first author identifiers correspond to the first plurality of document elements represented by the graphical user interface.

20 Claims, 8 Drawing Sheets

(51) Int. Cl.
*G06F 16/955* (2019.01)
*G06F 3/0481* (2013.01)

(56) References Cited

U.S. PATENT DOCUMENTS

| | | | | |
|---|---|---|---|---|
| 8,922,579 | B2* | 12/2014 | Mi | G09G 5/02 345/593 |
| 9,135,312 | B2 | 9/2015 | Greenspan et al. | |
| 9,208,137 | B2 | 12/2015 | Ginetti | |
| 2002/0078088 | A1* | 6/2002 | Kuruoglu | G06F 17/241 715/232 |
| 2003/0182621 | A1 | 9/2003 | Mazza et al. | |
| 2005/0138110 | A1* | 6/2005 | Redlich | C07K 14/70575 709/201 |
| 2008/0222510 | A1 | 9/2008 | Nguyen et al. | |
| 2009/0006948 | A1* | 1/2009 | Parker | G06F 3/0483 715/255 |
| 2009/0132907 | A1* | 5/2009 | Shao | G06F 17/2247 715/234 |
| 2010/0257457 | A1 | 10/2010 | De Goes | |
| 2013/0047072 | A1 | 2/2013 | Bailor | |
| 2013/0326323 | A1* | 12/2013 | Siwoff | G06F 17/2288 715/229 |
| 2014/0337718 | A1* | 11/2014 | Bostian | G06F 17/24 715/255 |

OTHER PUBLICATIONS

Ho, "Document revision history, in-cell dropdown, andmore new features in Google Apps," Google Cloud Official Blog, retrieved from internet at <https://cloud.goodleblog.com/2010/09/document-revision-history-in-cell.html> Sep. 30, 2010, 7 pages.

Quora, "How do you view the history or the most recent changes of a given spreadsheet cell?", retrieved from internet at <https://www.quora.com/Google-Sheets/How-do-you-view-the-history-or-the-most-recent-changes-of-a-given-spreadsheet-cell>, on Sep. 5, 2017, 4 pages.

Smartsheet, Inc., "Highlighting Changes Made to a Sheet," retrieved from internet at <https://help.smartsheet.com/customer/portal/articles/521974-highlighting-changes-made-to-a-sheet> on Sep. 5, 2017, Jul. 30, 2014, 4 pages.

* cited by examiner

ELECTRONIC DOCUMENT AUTHOR IDENTIFICATION

This application claims the benefit of U.S. Provisional Patent Application No. 62/393,791, entitled "Electronic Document Author Identification" and filed on Sep. 13, 2016, the disclosure of which is incorporated herein by reference in its entirety.

CROSS-REFERENCE TO RELATED APPLICAITON

Background

Document sharing is a mechanism that permits more than one user to edit an electronic document without collision or interfering with the work of other users on the same or related electronic document. An electronic document may be broken down into smaller parts such as elements or sections, and each of these smaller parts may have various users editing it at any one time; a user may edit multiple parts. As multiple users edit and save various document elements, it is desirable to provide or display an identifier that indicates which user has edited a particular document element. However, user identifiers that are stored with an electronic document are generally not stored in a suitable format for reading by other users (e.g., a "display name"). Additionally, for electronic documents with many document elements and different users (e.g., thousands or millions of document elements), management of the author identifiers for the document as a whole may be resource intensive.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
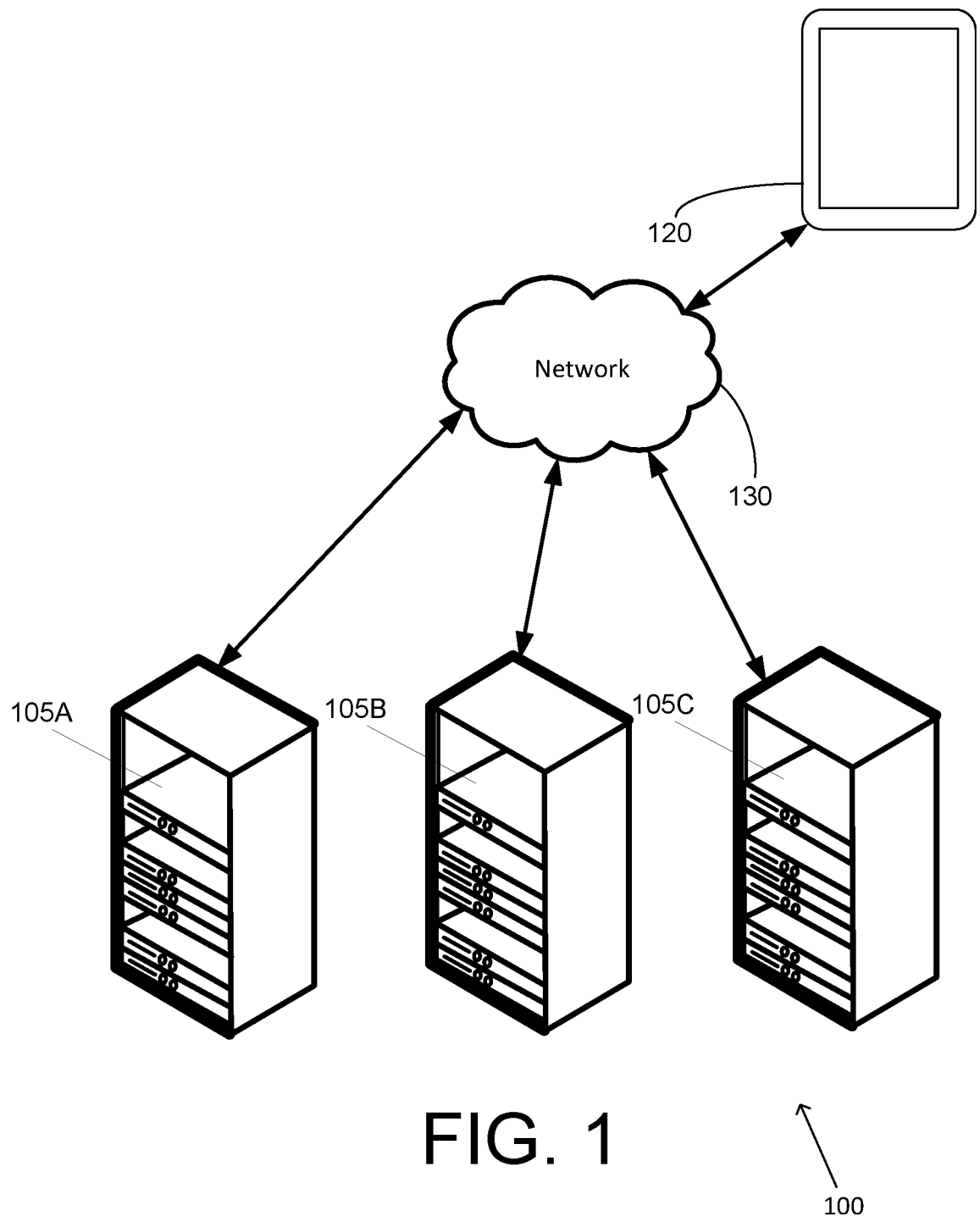
FIG. 1 is an example of a networking environment, including a data server and a client, in which various embodiments may be used.

Disclosed herein is a system and method for providing an indication of an author for a document element of an electronic document. Generally, a data server (e.g., a document server, application server, computing device, or other suitable network device) provides document content information for an electronic document to a client device of a user. The client device generates a graphical user interface for the user based on the document content information, where the graphical user interface represents document elements of the electronic document. The client device does not generally display indications of authors for the document elements within the graphical user interface unless the author name is explicitly part of the electronic document. In some scenarios, the data server provides author identifiers to the client device for display on the graphical user interface. For example, the server device provides visual indicators such as icons, images, or text that help to visually distinguish between the document elements edited by a particular author. However, in scenarios where the electronic document has many document elements and/or many authors (e.g., thousands or millions of document elements and/or hundreds of authors), the server cannot readily manage the selection of the number of visual indicators that may be needed. For example, an electronic document having 200 different authors for various document elements would require 200 different visual indicators, which may be cumbersome for the users of the electronic document to discern.

In various embodiments described herein, the client device manages the author identifiers that are displayed on the graphical user interface. In an embodiment, the client device selects visual identifiers for the authors based on the graphical user interface. For example, the client device selects and displays visual identifiers for authors corresponding to document elements that are currently displayed, while omitting visual identifiers for authors corresponding to document elements that are not currently or have not recently been displayed. In some embodiments, the client device predictively determines which document elements are soon to be displayed or likely to be displayed, for example, based on a user's scrolling behavior, and displays visual identifiers for the corresponding authors. In some scenarios, management of the visual identifiers by the client device allows for different visual identifiers to be assigned to different authors on different client devices and/or at different times.

In some scenarios, the electronic document includes smaller parts or discrete document elements (e.g., a numeric value representing revenue, the date of an event, the name of a person) that are shared with other users and/or across other electronic documents. In various embodiments, shared data provides for consistency because there is only one source (i.e., a source element); all other usages of the shared data are references to an original source element such that changes to the source element also propagate to corresponding "target elements" (i.e., elements that reference the source element by formula, function, or some other objectively-detectable mechanism that establishes a directional or bi-directional link between at least two elements). In some embodiments and/or scenarios, a source element is a field, cell, or other suitable element that is linked to a target element (or to multiple target elements). For example, the target element is a field, cell, table, equation, formula, calculation, or other suitable element that utilizes values or numbers stored in or associated with the source element. The target elements and their values are thus dependent on, or have a dependency relationship with, the corresponding source elements. Various mechanisms for saving document elements to a persistent storage, sharing, and thus updating the value of references promotes data integrity as well as a user's perceptions of system responsiveness. Advantageously, the client device sends fewer requests for user interface updates to the server because the updates are performed by the client device, and thus, in some scenarios, the load capacity (e.g., maximum number of users that can be supported) and performance (e.g., delays while processing) of the server are improved.

Elements can be constants or variables of various data types, but each element is uniquely addressable so that its parameters and values can be reachable in a networked environment. In some scenarios, an element is a uniquely addressable container that includes or is associated with other elements, for example, a table element that includes cell elements, a document element that includes document section elements (which may further include paragraph elements, etc.). A container element can contain other container elements, a single type of element, multiple types of elements, or various combinations thereof. Accordingly, elements can have nested or hierarchical relationships (e.g., a cell element nested within a table element) or dependencies.

Constants may be entered by a user in a form, table, spreadsheet, or document having fields, e.g., displayed on a computer screen, or originate from some other data source. Variables are the result of an equation or calculation designed to take other inputs that are either constants or the results of other equations or calculations. In various embodiments, an element is a target element if it refers to one or more other elements and is a source element if it is referred to by other elements. In some scenarios, an element is both a target element and a source element. If an element represents an equation, the equation is stored in or associated with the element as well. Accordingly, in at least some embodiments, dependency relationships or interconnections between elements are fully defined using only the elements themselves.

Changes made by a user can be entered into an electronic document in response to a specific request from the user or automatically. In some embodiments and/or scenarios, once a user (e.g., an author or editor) has completed editing an element or a plurality of elements, for example within a document section, and wishes to commit their changes, the author shares her changes to the elements (e.g., sends a share request or command to a data server), thereby making them visible to other users and unlocking the section as well as the contained elements so that others can edit them. Note that an element, document section, or an entire electronic document can automatically be shared when it is initially created. Continuing with the example, above, and alternately, the author can choose to discard the changes, in which case the changes to elements will be discarded, and the edited section will become unlocked without updating that document section so that other users can edit it.

In some embodiments and/or scenarios, the changes are automatically entered, for example, in real-time, near real-time, after a predetermined delay or auto-save period, after completion of an entry to a document element, or other suitable time. In an embodiment, for example, changes from a plurality of users are automatically entered during a document collaboration session.

Turning to FIG. 1, in an embodiment, the various methods described herein are carried out by an electronic document sharing system 100. In the embodiment illustrated in FIG. 1, the electronic document sharing system 100 includes first computing devices 105A, 105B, and 105C that are in communication with a second computing device 120 via one or more networks 130 (e.g., a local area network, a wide area network, a wired network, a wireless network, or the Internet). The first computing devices 105A, 105B, and 105C cooperate with each other to act as a cloud-based data server or distributed networked environment, in an embodiment. In other embodiments, the electronic document sharing system 100 includes a single first computing device or a suitable number of computing devices.

For ease of reference, the first computing device is referred to hereinafter as the "data server 105" and the second computing device is referred to as the "client 120." The first and second computing devices need not be in a server-client relationship, however. Although the data server 105 is depicted in FIG. 1 as rack-mounted server and the client 120 is depicted as a tablet computer, the data server 105 and client 120 may each be implemented as any type of computing device, including a desktop computer, notebook computer, or smartphone. Furthermore, there may be many other computing devices in communication with the data server 105. Although only a single data server is shown in FIG. 1 for clarity, elements within the electronic document sharing system 100 are stored on one or more data servers or computers which are interconnected via the network 130, in various embodiments.

The data server 105 in some embodiments stores, processes, and/or shares elements such as electronic documents, spreadsheets, tables, images, text, databases, or files and provides one or more user interfaces for the client 120. In various embodiments, a user (not shown) may use a user interface, provided by the data server 105, on the client 120, such as a local computer or a remote computer over a network. Likewise, in various embodiments, the electronic document system may operate on a computer local to the user, local to the electronic document sharing system 100, or remote from both over a network. In various embodiments, the electronic document sharing system 100 may be implemented using client-server architectures or as Software as a Service (SaaS) products. The electronic document sharing system 100 may be controlled by and communicate via a user terminal or keyboard/mouse/monitor (not shown).

Figure 2:
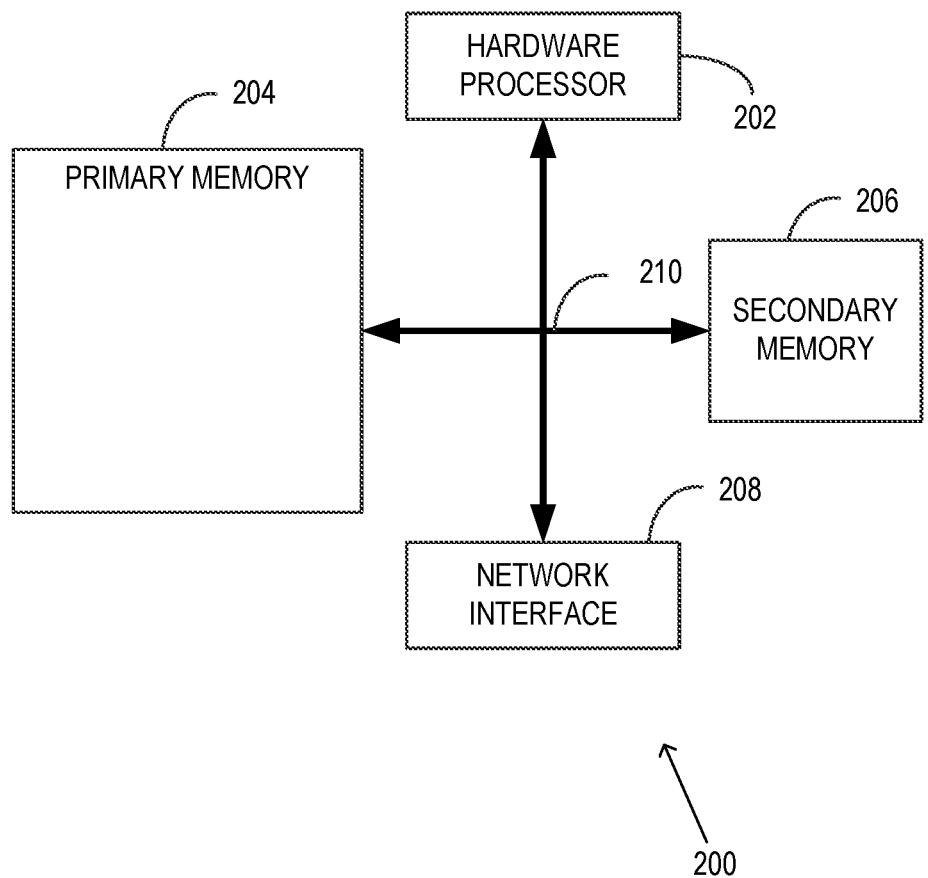
FIG. 2 shows a possible implementation of the data server of FIG. 1, according to an embodiment.

Turning to FIG. 2, a data server 200 is a possible implementation of the data server 105 and includes a hardware processor 202, a primary memory 204 (e.g., volatile memory, random-access memory), a secondary memory 206 (e.g., non-volatile memory, hard disk memory), and a network interface 208 that are communicatively coupled by one or more communication buses 210. In various embodiments, the secondary memory 206 (or another suitable memory) stores one or more electronic documents, document sections, or other suitable elements (e.g., spreadsheets, tables, images, or other data). In some embodiments, an element represents a portion of an electronic document that can be independently stored, locked, shared, etc. with other users. The data server 105 in general and the hardware processor 202 in particular are able to communicate with the client 120 of FIG. 1 via the network interface 208 over the network 130. The primary memory 204 stores instructions and data. The hardware processor 202 executes the instructions and uses the data to carry out various procedures including, in some embodiments, the methods described herein. In some embodiments, the data server 105 has one or more distributed components, such as a processor cluster for the hardware processor 202 or a distributed data store for the secondary memory 206, which can be communicated with via the network interface 208, a data bus architecture, or other suitable communication channel.

Figure 3:
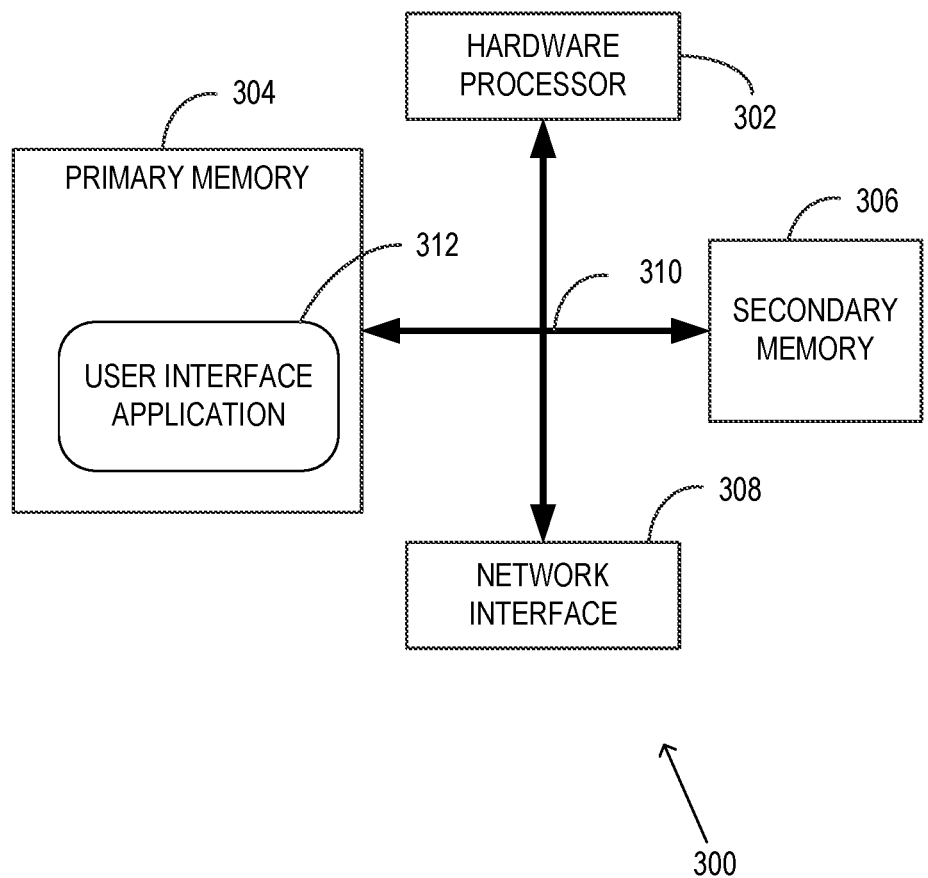
FIG. 3 shows a possible implementation of the client of FIG. 1, according to an embodiment.

Turning to FIG. 3, a client device 300 is a possible implementation of the client 120 and includes a hardware processor 302, a primary memory 304 (e.g., volatile memory, random-access memory), a secondary memory 306 (e.g., non-volatile memory, hard disk memory), and a network interface 308 that are communicatively coupled by one or more communication buses 310. The client 120 in general and the hardware processor 302 in particular are able to communicate with the data server 105 of FIG. 1 via the network interface 308 over the network 130. The memories 304 and 306 store instructions and data. The hardware processor 302 executes the instructions and uses the data to carry out various procedures including, in some embodiments, the methods described herein. In various embodiments, the instructions stored in the memories 304 or 306 include a user interface application 305. The client 120 executes the user interface application 305 and cooperates with the data servers 105 to carry out one or more portions or steps of the methods described herein.

In various embodiments and/or scenarios, the client 120 provides an indication of an author for a document element of an electronic document. In an embodiment, the data server 105 provides document content information for the electronic document to the client 120. The document content information generally defines the content of the document and, in some cases, a format in which the content is to be displayed. In an embodiment, the document content information indicates that a table having a certain number of rows and columns should be displayed. In a further embodiment, the document content information indicates that a cell should be displayed having a display value of "Balance Sheet" at a specified location within the table. In various embodiments, the document content information includes information for a single document element, a plurality of document elements, a container element, or other suitable combination of elements. In some embodiments, the document content information includes a user ID of a most recent author of the corresponding document element. In some embodiments, the "most recent" author is determined relative to a current time or virtual time of the electronic document. In an embodiment, for example, a user performs a "roll back" of an electronic document to an earlier time (or a corresponding earlier version) selected by the user and the "most recent" author is determined relative to the earlier time.

The client 120 generates a graphical user interface for a user based on the document content information, where the graphical user interface represents document elements of the electronic document. In an at least some embodiments and/or scenarios, the client 120 displays only a portion of the electronic document. In various embodiments, the client 120 manages visual identifiers that are displayed on the graphical user interface to indicate which author is a most recent author of a particular document element. For example, the client 120 selects one or more visual identifiers for the author identifiers and displays the visual identifiers with the graphical user interface. In some embodiments, the client 120 selects the visual identifiers based on the graphical user interface. For example, the client 120 selects the visual identifiers based on i) document elements that are currently displayed on the graphical user interface, ii) document elements that have recently been displayed on the graphical user interface, iii) currently or recently used visual identifiers for the same user, iv) currently or recently used visual identifiers for other users, and/or v) visual identifiers for document elements that predictively determined as likely to come into view. In some embodiments, the client 120 selects the visual identifiers (or a number of visual identifiers to be displayed) based on characteristics associated with the client 120, for example, an amount of available memory, a maximum number of visual identifiers to be displayed (e.g., based on hardware of the client 120 or a selection by the user of the client 120), or other suitable characteristic. In an embodiment, for example, the client 120 displays a legend of visual identifiers for an entire document section or an entire electronic document, but grays out visual identifiers for authors that are not represented in the currently displayed area.

The client 120 selects one or more visual identifiers for authors of the electronic document and generates the visual identifiers to indicate which of the authors correspond to the document elements displayed on the graphical user interface. Examples of visual identifiers include an outline of the document element or a cell border (e.g., border thickness, dashed or solid line, line thickness, etc.), a color of an overlaid translucent region, font color, font face, text formatting, transparency level, crosshatch or shading pattern, or other suitable visual identifier. In some embodiments, the visual identifiers are based on the corresponding document element. In an embodiment, for example, cells of a table have different colors of cell borders while text boxes have different colors of translucent regions. In some embodiments, the client 120 selects multiple visual identifiers for a single document element, for example, a cell border combined with an overlaid translucent region.

In various embodiments, the client 120 selects visual identifiers for the author identifiers based on the graphical user interface. For example, the client device selects and displays visual identifiers for authors corresponding to document elements that are currently displayed, while omitting visual identifiers for authors corresponding to document elements that are not currently displayed (or have not recently been displayed). In some scenarios, management of the visual identifiers by the client device allows for different visual identifiers to be assigned to a same author, dependent upon the client on which the corresponding document element is displayed and/or the time at which the document element is displayed.

The visual identifiers include lead lines, arrows, display symbols (e.g., an icon or avatar image), or other suitable graphical elements, in some embodiments. In an embodiment, the client 120 selects one or more different characteristics of an arrow or lead line for different authors, for example, line color, line type (e.g., dashed, solid, dot-dash, etc.), arrow head or end type, or other suitable visual characteristic.

In some embodiments, the visual identifiers include a display name for the corresponding author. In an embodiment, the client 120 sends a request for display names to a directory service device. For example, in response to receipt of document content information that includes a user ID for the author, the client 120 sends a request with the user ID to the directory service device to obtain the display name. In this way, the client 120 can provide a visual identifier that is more readily distinguishable by a user, for example, display names of "Matt" and "Levi" instead of user IDs of "5308" and "5309." In some embodiments, the directory service device is implemented on the data server 105. In other embodiments, the directory service device is a separate server or other suitable network device that is reachable via the network 130.

In some embodiments, the client 120 displays a legend of the visual identifiers (e.g., the display name or display symbol) that is located in a display area separate from at least some of the document elements. In other embodiments, the client 120 provides the display name in a vicinity of the corresponding document element, for example, a display name adjacent to the document element with an arrow or lead line pointing to the document element.

The client 120 maintains a list of author identifiers, in various embodiments. For example, the client 120 locally caches authorship information (e.g., the author identifiers received from the data server 105) and maintains a list that associates the author identifiers with corresponding visual identifiers. In some scenarios, the cached authorship information for the additional cells provides improved performance when updating the graphical user interface, for example, when the user scrolls through the electronic document. In some scenarios as described above, an electronic document includes more document elements than can be readily displayed at one time (e.g., due to limited screen size of the client 120). In an embodiment, the client 120 maintains the list to include only those author identifiers that have corresponding document elements that are displayed on the graphical user interface (e.g., viewable by the user of the client 120). In other embodiments, the client 120 maintains the list of author identifiers based on processing and/or memory resources of the client 120 (e.g., available memory, processor utilization, available data transfer rate, or other suitable resource).

In another embodiment, the client 120 maintains the list to include author identifiers for at least some document elements that are not currently displayed, for example, document elements that are just beyond or outside of a viewable area on the graphical user interface. As one example, an electronic document that has a data table with 1000 cells, of which only 200 cells are viewable via the graphical user interface, the client 120 caches the authorship of 300 cells that includes the 200 viewable cells and 100 additional cells (e.g., around a margin of the 200 viewable cells). In other words, the client 120 caches author identifiers that correspond to document elements that are within a predetermined range of the viewable document elements, for example, within five document elements (e.g., within five cells), within a multiple of a fixed distance (e.g., within four scrollable "screens" of the viewable document elements), or other suitable range. In some embodiments, the client 120 predictively determines which document elements are likely to come into view. In an embodiment, the client 120 determines the document elements based on graphical user interface characteristics (e.g., a number of rows or columns to scroll per scrolling input), user behavior (e.g., a rate of scrolling inputs provided by the user), or other suitable characteristics, for example, a scrolling speed as a user scrolls through the electronic document. In an embodiment, for example, the client 120 determines that ten document elements are likely to be displayed for a first scrolling speed and determines that twenty document elements are likely to be displayed for a second scrolling speed that is twice the first scrolling speed. In an embodiment, the client 120 sends scrolling data to the data server 105, the data server 105 determines which document elements are likely to be displayed within a predetermined time period and sends the corresponding author identifiers to the client 120. In another embodiment, the client 120 determines which document elements are likely to be displayed based on the scrolling data and sends a request for the corresponding author identifiers to the data server 105. In some embodiments, the client 120 sends a request for the author identifiers to the data server 105 separately from a request for the corresponding document contents.

In some embodiments and/or scenarios, the client 120 selects multiple visual identifiers for a same author. As changes are made by various authors, the changes to the document elements are propagated to one or more clients 120. The changes to elements resulting from users' edits can be classified as being either direct changes or indirect changes. In an embodiment, the client 120 selects different visual identifiers to correspond to direct changes and indirect changes for the same author. For example, a solid line border of a cell in a table can be used to indicate a corresponding direct change to an element, while a dashed line border of the cell can be used to indicate an indirect change to an element. As described above, target elements and their values are dependent on, or have a dependency relationship with their corresponding source elements. Such dependencies are not only limited to a first level, but can extend many levels deep, i.e., a change in a first element can cause a change in a second element, which can cause a change in a third element, etc. In various embodiments, the direct changes are those changes to source elements that the author directly makes herself, and the indirect changes are those changes to target elements that result from the direct changes to the source element of a target element or other indirect changes. In some embodiments, the indirect element share includes updating links, formulas, and calculations for target elements. While only two stages (i.e., direct and indirect) are described for clarity, the changes are separated into additional stages or sub-stages within a stage in other embodiments.

In an embodiment, the client 120 selects multiple visual identifiers for the same author based on a timestamp of the changes by the author. For example, the client 120 selects a first visual identifier having a first transparency (e.g., 50%) for a first change by an author and selects a second visual identifier having a second transparency (e.g., 25%) that is less than the first transparency for a second change by the author, where the second change occurs after the first change. In this example, more recent changes (i.e., the second change) appear more visually prominent or "bold" to the user because of the reduced transparency. In other embodiments, the client 120 selects an outline of a document element, such as a cell border, as the visual identifier and selects a thickness of the outline according to the timestamp of the change (e.g., a thicker border corresponding to a more recent timestamp).

In some embodiments and/or scenarios, the client 120 selects multiple visual identifiers for a same document element. In an embodiment, for example, the client 120 selects i) a cell outline that corresponds to a first author, and ii) an overlaid translucent region that corresponds to a second author. In this embodiment, the client 120 provides an indication of multiple authors that have contributed to the content of the document element, or alternatively, prior authors of the document element (e.g., an author history of the document element). In some embodiments, the client 120 selects visual identifiers for different portions of the document element. In an embodiment, for example, the client 120 selects a first overlaid translucent region for a first portion (e.g., a left half) of the document element and a second overlaid translucent region for a second portion (e.g., a right half) of the document element. In other embodiments, the client 120 selects other suitable combinations of visual identifiers for the document element.

Although the description herein focuses on users (e.g., authors and editors), in some embodiments the "author" is a provider or source of data for the document element, for example, a database, computing device, server, or other suitable data source that provides data for the document element. In an embodiment, for example, document elements that are retrieved from a first database are represented by a first visual identifier while document elements retrieved from a second database are represented by a second visual identifier. In some embodiments, the client 120 selects the visual identifier based on both the author and the data source, for example, utilizing up to four visual identifiers for two authors and two data sources, up to nine visual identifiers for three authors and three data sources, etc. In some embodiments, the client 120 selects the visual identifiers for the data sources and authors separately, as described above for multiple visual identifiers for a same document element.

Figure 4:
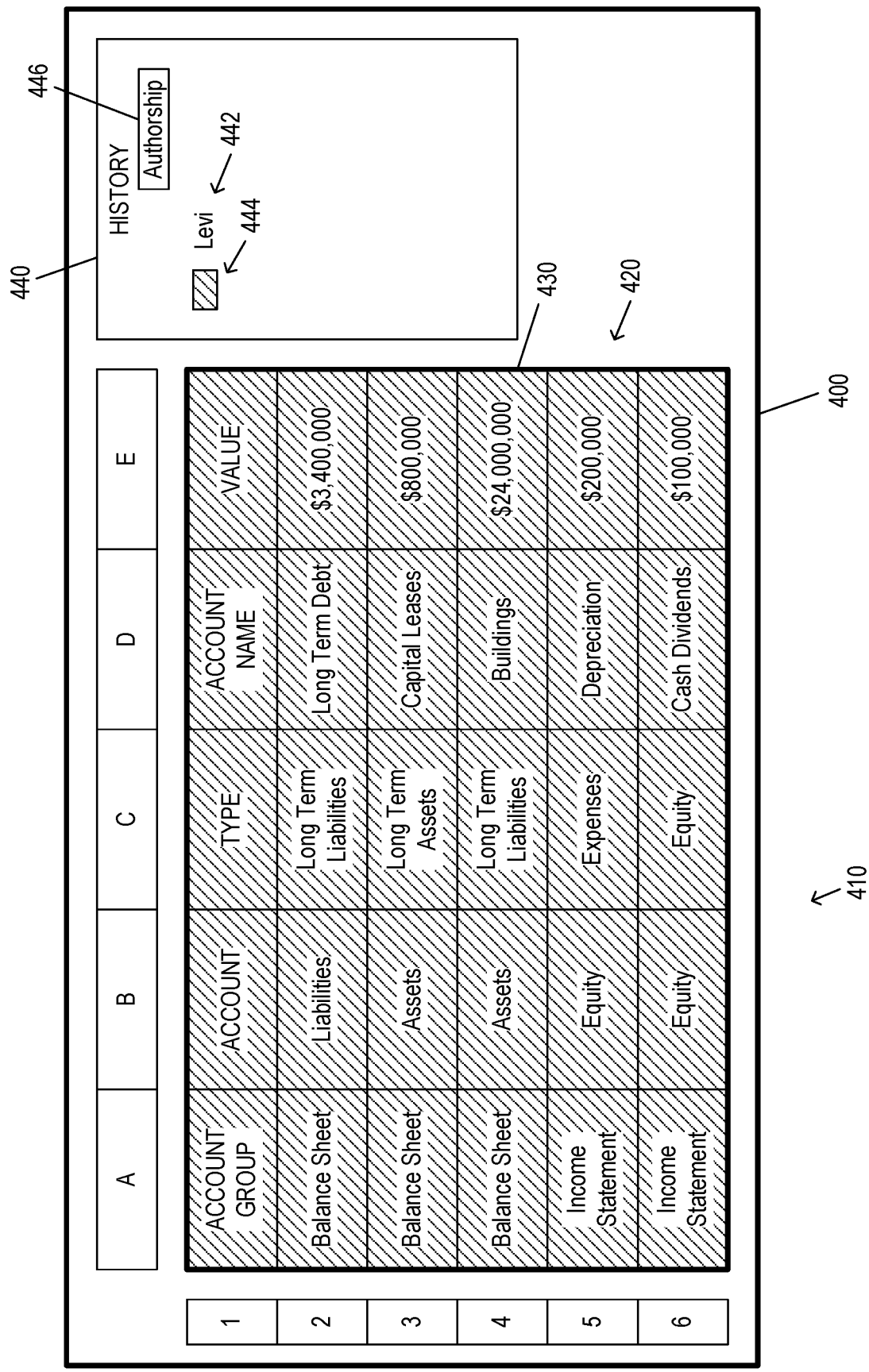
FIG. 4 is a diagram of an example graphical user interface for display of visual identifiers for a list of author identifiers at a first time, according to an embodiment.

FIG. 4 is a diagram of an example graphical user interface 400 for display of visual identifiers for a list of author identifiers at a first time, according to an embodiment. The graphical user interface 400 is generated by the client 120, in an embodiment. In other embodiments, the graphical user interface 400, or a portion thereof, is generated by the data server 105, a user interface server (not shown), or another suitable network device.

In the embodiment shown in FIG. 4, the graphical user interface 400 represents document elements of an electronic document 410 that is a data table, including rows 1 through 6 and columns A through E. In the description below, individual document elements, or cells, are referred to by their column and row, for example, cell A1 has a value of "ACCOUNT GROUP" while cell D3 has a value of "Capital Leases." Although only 31 document elements are shown (i.e., one table element and 30 cells), the electronic document 410 includes additional or fewer document elements, in various embodiments and/or scenarios.

For generation of the graphical user interface 400, the client 120 receives first document content information from the data server 105 or another suitable remote source, in various embodiments. The first document content information corresponds to a plurality of document elements of an electronic document, for example, the table element and cells of the electronic document 410. The client 120 generates the graphical user interface 400 based on the first document content information. The first document content information corresponds to a first time or timestamp. The timestamp generally indicates the time at which the contents of the document elements were created or last changed. In at least some embodiments, each document element has a separate timestamp.

In some embodiments, the first document content information is a single block of data, for example, an extensible markup language (XML) file, that includes the plurality of document elements. In other embodiments, the first document content information includes multiple blocks of data, for example, one data block per container element, one data block per document element, one data block for a plurality of document elements, or other suitable organization. In an embodiment, the data server 105 alternates between multiple data organizations for providing various document content information to the client 120. For example, the data server 105 sends a first data block that includes the table element and the cells at a first time and sends a second data block that includes only one or more updated cells (e.g., second document content information with a second timestamp) at a second time.

In various embodiments and/or scenarios, the client 120 receives first author identifiers that indicate most recent authors for the document elements of the electronic document 410. In an embodiment, the data server 105 includes the first author identifiers within the first document content information. In another embodiment, the data server 105 includes the first author identifiers in a data block that is transmitted separately from the first document content information. The first author identifiers correspond to the first timestamp (e.g., the timestamp of the first document content information). As discussed above, the author identifiers are user IDs, in an embodiment.

As discussed above, the client 120 selects visual identifiers for the first author identifiers based on the graphical user interface, in various embodiments. The client 120 assigns the selected visual identifiers to the corresponding author identifier and generates the visual identifiers to indicate which of the author identifiers correspond to the document elements represented by the graphical user interface 400. In the embodiment shown in FIG. 4, each of the cells A1::E6 has an author with an author identifier of "5309" and a display name of "Levi" and the client 120 selects an overlaid translucent region with a cross-hatch pattern as the visual identifier. In the embodiment shown in FIG. 4, the list of author identifiers includes only the author identifier of 5309 for Levi.

In an embodiment, the client 120 generates an overlay 420 that includes the visual identifier at locations (e.g., at a document content region 430) of the corresponding document elements and displays the overlay over the graphical user interface 400. In some embodiments, the overlay 420 and the graphical user interface 400 are generated simultaneously by the client 120, for example, based on the document content information received from the data server 105 and the visual identifiers selected by the client 120. In other embodiments, the client 120 generates a first layer of the graphical user interface 400 to represent the document content information received from the data server 105 and generates a second layer of the graphical user interface 400 as the overlay 420 to represent the visual identifiers selected by the client 120. In still other embodiments, the client 120 receives the first layer of the graphical user interface 400 from the data server 105 (e.g., as an image or other suitable format) and separately generates the second layer to represent the visual identifiers selected by the client 120.

In some embodiments, the client 120 generates an overlay 440 that includes i) display names that correspond to the list of author identifiers, and ii) the visual identifiers that correspond to the display names. The overlay 440 represents a legend of the visual identifiers and corresponding display names. The client 120 displays the overlay 440 over the graphical user interface 400 in a similar manner as the overlay 420. In the embodiment shown in FIG. 4, the overlay 440 includes a display name field 442 ("Levi") and corresponding visual identifier 444, which visually matches the overlay 420.

The client 120 is configured to allow the user to selectively activate and deactivate the display of the visual identifiers, in various embodiments. For example, the client 120 provides a toggle button 446, switch, or other suitable interface for activation and deactivation of the display of the visual identifiers. The client 120 hides or stops displaying the overlay 420 when the toggle button 446 corresponds to a deactivated state and displays the overlay 420 when the toggle button 446 corresponds to an activated state.

Figure 5:
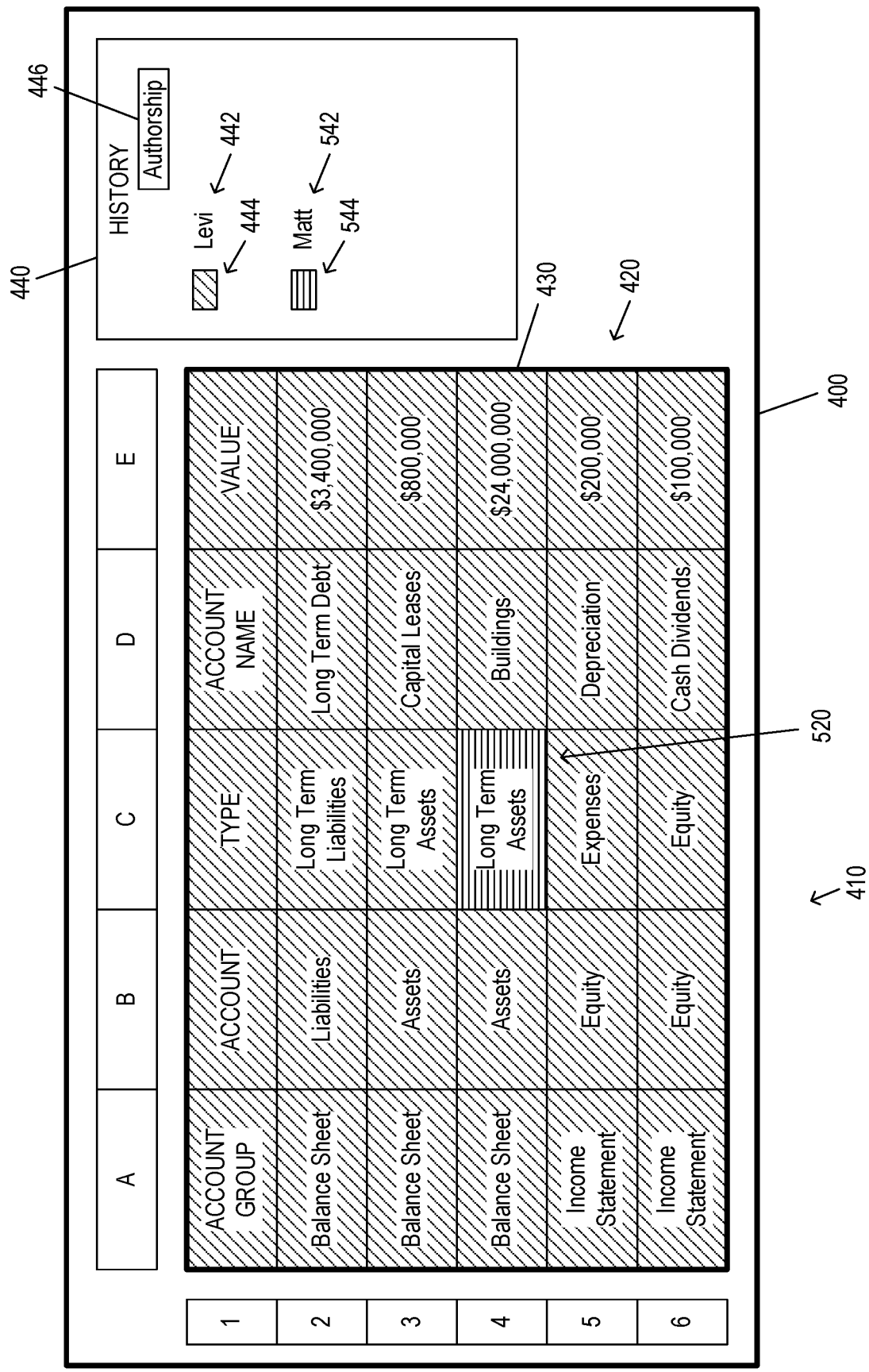
FIG. 5 is a diagram of the graphical user interface of FIG. 4 at a second time, illustrating different visual identifiers for different authors, according to an embodiment.

FIG. 5 is a diagram of the graphical user interface 400 of FIG. 4 at a second time, illustrating different visual identifiers for different authors, according to an embodiment. The client 120 receives second document content information that corresponds to a second document element of the electronic document 410 from the data server 105. In the embodiment shown in FIG. 5, the second document content information is provided in response to a change in a value of a document element. In some embodiments, changes entered into the electronic document 410 are provided by the data server 105 to the client 120 as the second document content information in real-time, near real-time, after a predetermined delay, or other suitable time.

In other embodiments and/or scenarios, the client 120 receives the second document content information as the user of the graphical user interface 400 scrolls through the electronic document 410, moves to a different section of the electronic document 410, resizes the graphical user interface 400, or performs another suitable action which causes a change in the document elements displayed by the graphical user interface 400. Although the described embodiment of the second document content information includes only the second document element, the second document content information includes a plurality of second document elements from one or more users of the electronic document 410, in other embodiments and/or scenarios.

The second document content information has a second timestamp which indicates a time at which the contents of the corresponding document elements were created or last changed. In some embodiments, the client 120 displays the timestamp, for example, within the overlay 440 (e.g., adjacent to the display name 442), in a "pop-up region" (not shown) in response to a mouse-hover over a cell or selection of the cell, or other suitable location.

In the embodiment shown in FIG. 5, the value of cell C4 has been changed from "Long Term Liabilities" to "Long Term Assets" by a user with a display name of "Matt" and user ID of "5308." The second document content information thus includes new content for the cell C4 and the user ID of 5308. The client 120 updates the graphical user interface 400 to represent the document elements based on the second document content information. In an embodiment, the client 120 updates the graphical user interface 400 in real-time (or near real-time) in response to receipt of the second document content information.

The client 120 maintains the list of author identifiers and updates the list to include the second identifier corresponding to the second document content information. The client 120 also updates the visual identifiers to indicate which of the author identifiers correspond to the document elements represented by the graphical user interface 400. The client 120 selects a visual identifier for the user ID of 5308 and generates the visual identifier, in a manner similar to that discussed above. In the embodiment shown in FIG. 5, the client 120 selects an overlaid translucent region with a horizontal line pattern as the visual identifier and generates a corresponding overlay 520 for the user ID of 5308.

Where the overlay 440 is displayed, the client 120 updates the overlay 440 to include a display name field 542 ("Matt") and corresponding visual identifier 544, which visually matches the overlay 520. In some embodiments, the overlays corresponding to the author identifiers are separately activatable and deactivatable. For example, the display name fields 442 and 542 can be "clicked" or otherwise suitably toggled to display or hide the corresponding overlay 420 or 520.

In an embodiment, changes to the electronic document 410 that occur in cells that are outside of the viewable area (e.g., outside A1::E6 in the illustrated embodiments) are not propagated to the client 120 and are not shown in the legend or provided in the cache. In other words, if a first user makes a change to a document element that is outside of a viewable range that a second user is currently viewing, the change from the first user is not shown in the legend of the second user's graphical user interface until the second user scrolls to a range that includes the changed document element or the changed document element is predictively determined to be displayed. For example, if Editor A is viewing cell A1::D25 and Editor B makes an edit in cell D1000, that edit won't appear in the legend shown to Editor A until Editor A scrolls to a range that includes D1000.

Figure 6:
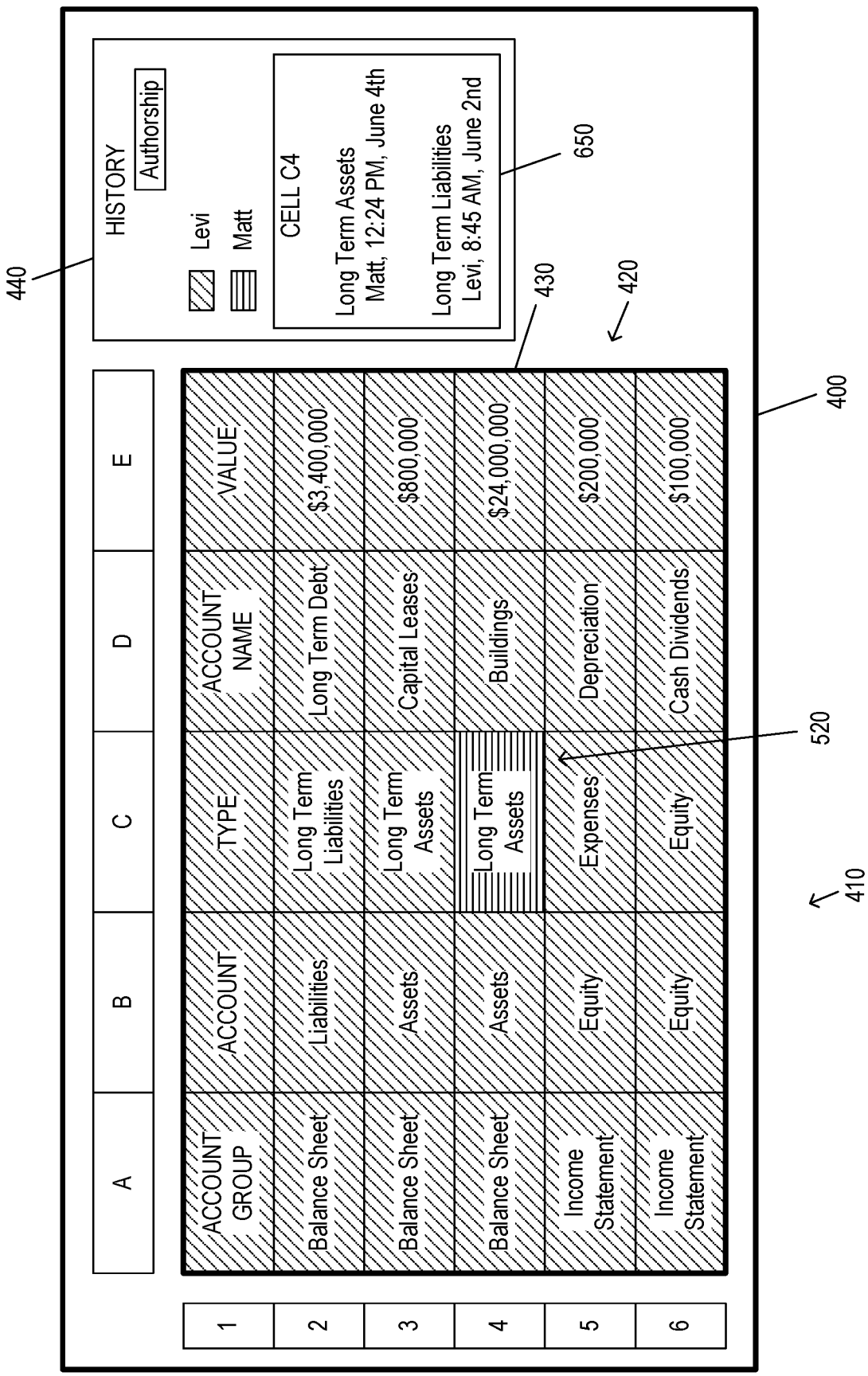
FIG. 6 is a diagram of another example graphical user interface, illustrating a document element history, according to an embodiment.

FIG. 6 is a diagram of another example graphical user interface 600, illustrating a document element history, according to an embodiment. The graphical user interface 600 is similar to the graphical user interface 400, but includes an element history region 650, in various embodiments. The client 120 allows the user to select a document element and, in response, the client 120 displays one or more prior values of the selected document element in the element history region 650. In the embodiment shown in FIG. 6, the user has selected cell C4 and the client 120 displays the corresponding prior values. Using the embodiments described above as an example, the first document content information includes a first value ("Long Term Liabilities") with a first timestamp ("8:45 AM, June 2nd") and the second document content information includes a second value ("Long Term Assets") with a second timestamp ("12:24 PM, June 4th"). As illustrated in FIG. 6, the client 120 displays the current value (the second value) along with the second timestamp and displays the prior value (the first value) along with the first timestamp in the element history region 650.

In some embodiments, the client 120 sends a request to the data server 105 to obtain the prior values of the selected document element. In other embodiments, the data server 105 does not store the document element history. In these embodiments, the client 120 caches the document element history as updates are received from the data server 105. In other words, the client 120 receives a first set of values for document elements of the graphical user interface 500 and, in response to a second set of values for the document elements, caches the first set of values and updates the displayed values to the second set of values.

Figure 7:
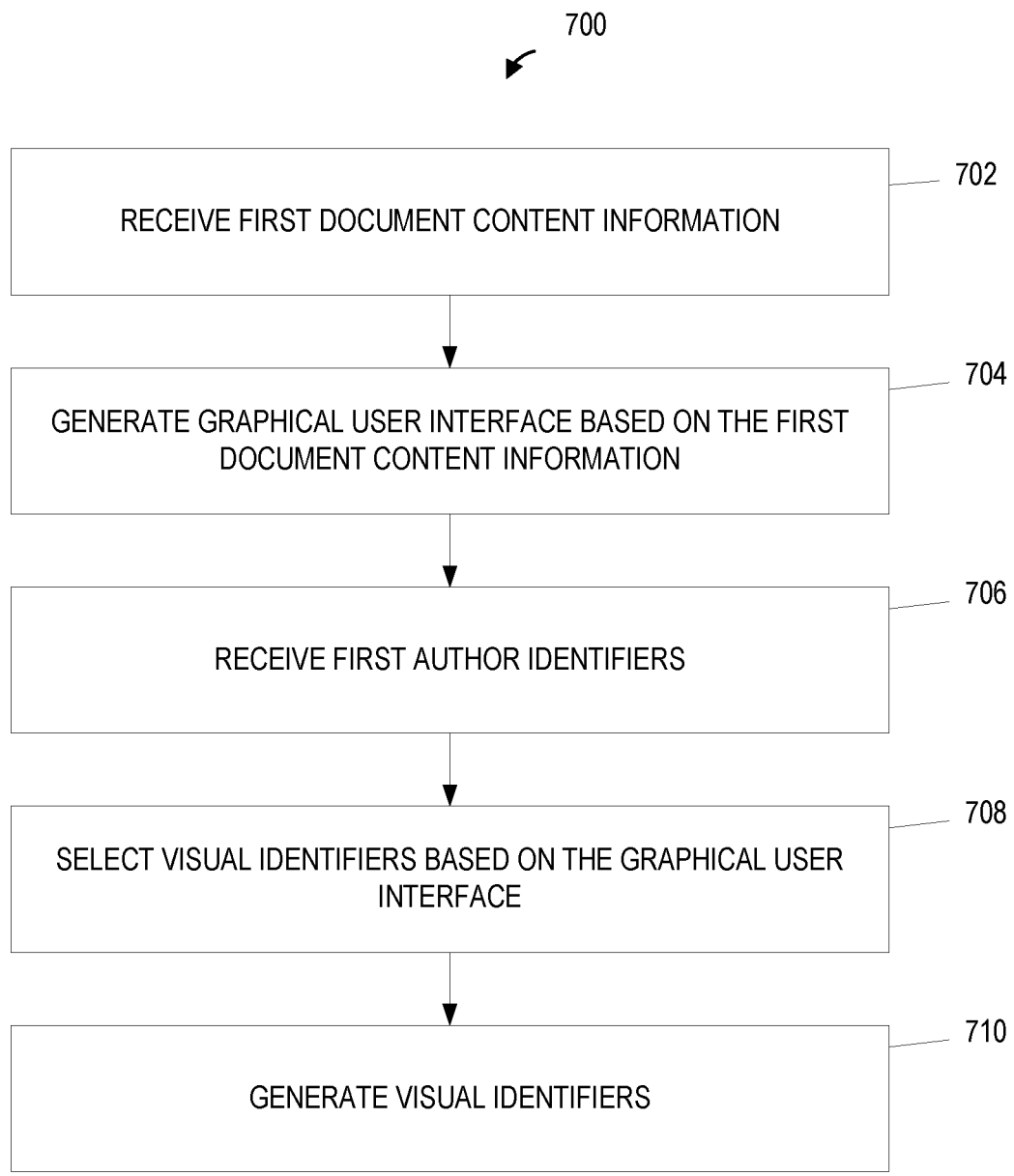
FIG. 7 is a flowchart of a method for providing an indication of an author for a document element of an electronic document that may be performed by the client of FIG. 1, according to an embodiment.

FIG. 7 is a flow diagram illustrating an example method 700 for providing an indication of an author for a document element of an electronic document, according to an embodiment. In an embodiment, the method 700 is implemented by a client in the electronic document sharing system 100, according to an embodiment. With reference to FIG. 1, the method 700 is implemented by the client 120, in an embodiment. In other embodiments, the method 700 is implemented by other suitable network devices.

At block 702, the client 120 receives first document content information that corresponds to a first plurality of document elements of an electronic document, from the data server 105. In some embodiments and/or scenarios, the first document content information corresponds to an entire electronic document. In some embodiments and/or scenarios, the first document content information corresponds to a portion of the entire electronic document, for example, based on a display area of the client 120 or based on a portion of the entire electronic document selected by a user.

At block 704, the client 120 generates a graphical user interface that represents the first plurality of document elements based on the first document content information. In an embodiment, for example, the client 120 generates the graphical user interface 400.

At block 706, the client 120 receives first author identifiers that indicate most recent authors for the first plurality of document elements. The first document content information and the first author identifiers correspond to a first timestamp (or document revision). In some embodiments and/or scenarios, the client 120 receives the first author identifiers with the first document content information, for example, as part of a sequence of packets or data blocks. In other embodiments and/or scenarios, the client 120 receives the first author identifiers separately from the first document content information. In an embodiment, the client 120 sends a request for the first author identifiers.

At block 708, the client 120 selects visual identifiers for the first author identifiers based on the graphical user interface. For example, as discussed above, the client 120 selects the visual identifiers based on i) document elements that are currently displayed on the graphical user interface 400, ii) document elements that have recently been displayed on the graphical user interface 400, iii) currently or recently used visual identifiers for the same user, iv) currently or recently used visual identifiers for other users, and/or v) visual identifiers for document elements that predictively determined as likely to come into view.

At block 710, the client 120 generates the visual identifiers to indicate which of the first author identifiers correspond to the first plurality of document elements represented by the graphical user interface. In an embodiment, the client 120 i) generates an overlay that includes the visual identifiers at locations of the corresponding document elements of the first plurality of document elements, and ii) displays the overlay over the graphical user interface that represents the first plurality of document elements. For example, with reference to FIG. 5, the client 120 generates the overlay 520 at the location of cell C4 and generates the overlay 420 at the locations of cells A1::B6, C1::C3, C5::C6, and D1::E6.

In an embodiment, selecting the visual identifiers includes assigning a color to an author identifier. In this embodiment, the client 120 generates the overlay by generating a translucent region with the color assigned to the author identifier and displays the translucent region over a document content region of the graphical user interface that corresponds to the document element.

In some embodiments, the client 120 receives second document content information that corresponds to a second document element of the electronic document from the data server 105 in real-time. In one such embodiment, the client 120 updates the graphical user interface to represent the second document element based on the second document content information and updates the visual identifiers to indicate which of the first author identifiers corresponds to the second document element represented by the graphical user interface. In some embodiments, the second document content information corresponds to a document element that is already displayed by the graphical user interface (e.g., the first plurality of document elements includes the second document element). In an embodiment, the client 120 receives a second author identifier that indicates a most recent author for the second document element. In this embodiment, the second document content information and the second author identifier correspond to a second timestamp. The client 120 selects a visual identifier for the second author identifier based on the graphical user interface, maintains a list of author identifiers that includes the first author identifiers and the second author identifiers, and updates the visual identifiers to indicate which of the first author identifiers and the second author identifier correspond to the document elements represented by the graphical user interface. In an embodiment, the client 120 generates an overlay that includes i) display names that correspond to the list of author identifiers, and ii) the visual identifiers that correspond to the display names, and displays the overlay over the graphical user interface that represents the first plurality of document elements. For example, the client 120 generates the overlay 440 with the display name fields 442 and 542 and the visual identifiers 444 and 544.

In an embodiment, the client 120 generates the graphical user interface to omit representation of the first plurality of document elements and generates the overlay to include i) display names that correspond to at least some of the first author identifiers, and ii) the visual identifiers that correspond to the at least some of the first author identifiers. In other words, the client 120 caches the display names and displays the cached display names even when the corresponding document element is not currently displayed. As an example with reference to FIG. 5, the first plurality of document elements includes cells A1::E6 with corresponding author identifiers for Levi and Matt. In this example, the client 120 generates the graphical user interface 400 to omit cells A1::C6 in response to the user scrolling six columns to the right. As a result of the scrolling, the client 120 receives second document content information (e.g., corresponding to F1:J6) and corresponding second author identifiers. The client 120 updates the overlay 440 to include display names that correspond to at least some of the first author identifiers (e.g., Levi or Matt). In at least some scenarios, the display names (and author identifiers) are cached even when the display name or visual identifier is not currently displayed so that assigned visual identifiers are not frequently re-assigned as the user views different portions of the electronic document.

In some embodiments, the data server 105 stores and/or maintains the electronic document as a sequence or timeline of edits. In an embodiment, each edit is stored with a timestamp and is also associated with a document revision (e.g., version 1, version 2, etc.). The edit is associated with the document revision when the electronic document is "shared" or published by the user. In some embodiments, edits that are made by multiple authors are incorporated into the electronic document to create a document revision when a user shares the document. In some scenarios where multiple edits from different users conflict with each other, the data server 105 selects the edit with a most recent timestamp for incorporation into the document revision.

Figure 8:
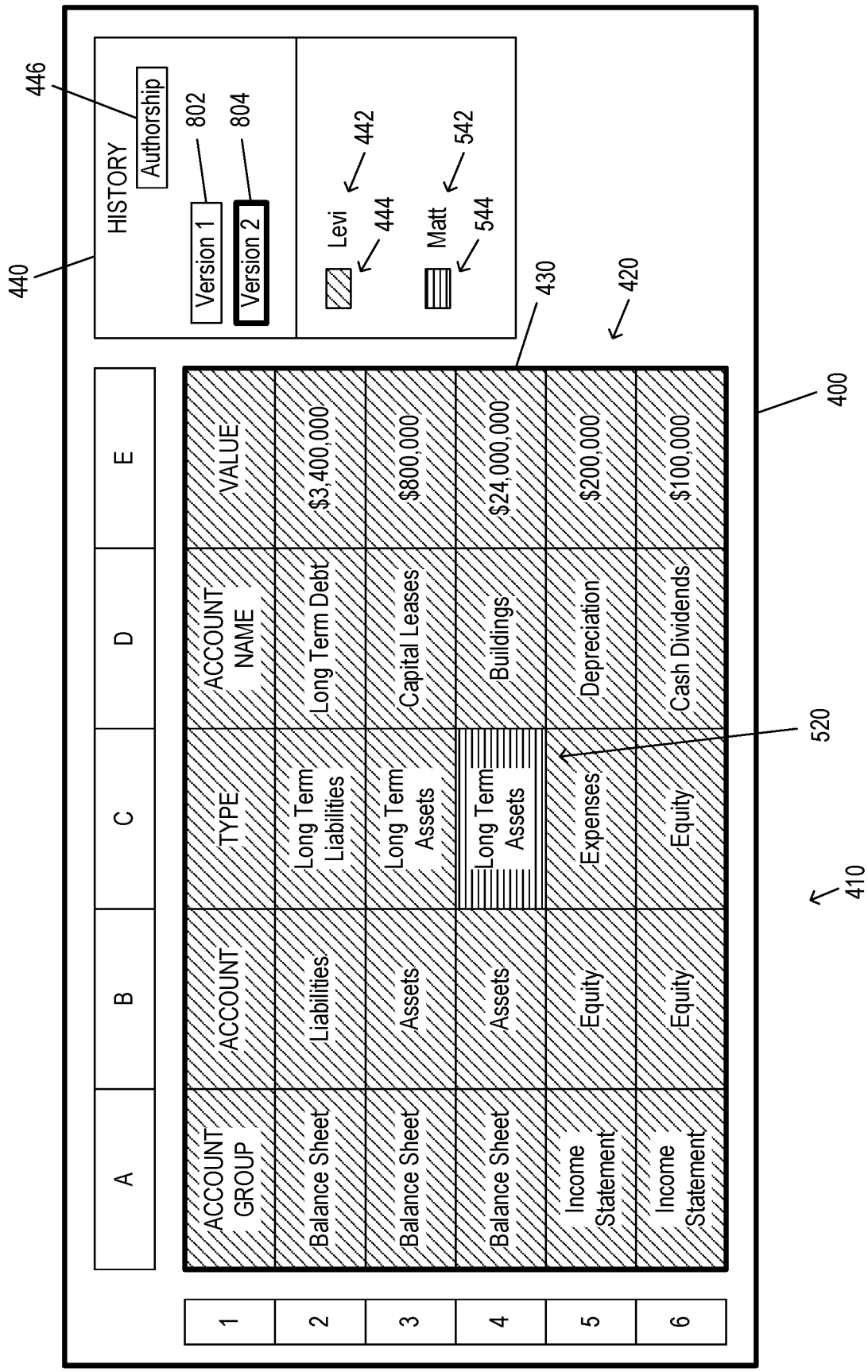
FIG. 8 is a diagram of the graphical user interface of FIG. 5 illustrating a version toggle button, according to an embodiment.

FIG. 8 is a diagram of the graphical user interface 400 and illustrates one or more version buttons for toggling between different versions or document revisions of the electronic document 410. In the embodiment shown in FIG. 8, the overlay 440 includes version buttons 802 and 804 that correspond to a Version 1 and a Version 2 of the electronic document 410, respectively, which correspond to the electronic document 410 at the first time (FIG. 4) and the second time (FIG. 5). As shown in FIG. 8, the version button 804 (Version 2) has been selected and thus the graphical user interface 400 is similar to that shown in FIG. 4, having display name fields 442 and 542 and visual identifiers 444 and 544. As an example, when the user selects the version button 802 (Version 1), the value of the cell C4 is changed back to "Long Term Liabilities," the overlay 520, display name field 542, and visual identifier 544 are omitted, and the overlay 420 is displayed to include the cell C4, as shown in FIG. 4. In some embodiments, the client device automatically toggles through the versions sequentially (e.g., at a time interval of 2 seconds, 5 seconds, or other suitable interval) to show the changes corresponding to the different versions by the corresponding authors. In an embodiment, the overlay 440 provides an indication of which editors have provided the most changes to the corresponding version (e.g., top 5 authors by number of edits), the most recent authors to the corresponding version, or other suitable lists of selected authors.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises", "comprising", "includes", "including", "has", and "having", as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first", "second", etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

We claim:

1. A method implemented on a client device, the method comprising:

receiving, at the client device and from a data server, first document content information that corresponds to a first plurality of document elements of an electronic document;

generating, by the client device, a first layer of a graphical user interface that represents the first plurality of document elements based on the first document content information;

receiving, at the client device, first author identifiers that indicate most recent authors for the first plurality of document elements, wherein the first document content information and the first author identifiers correspond to a first timestamp;

selecting, by the client device, visual identifiers for the first author identifiers based on the first layer of the graphical user interface as generated by the client device, including assigning a color to an author identifier of the first author identifiers, the author identifier corresponding to a most recent author of a plurality of adjacent document elements of the first plurality of document elements; and generating, by the client device, the visual identifiers to indicate which of the first author identifiers correspond to the first plurality of document elements represented by the graphical user interface, including generating an overlay as a separate, second layer of the graphical user interface that includes the visual identifiers at locations of the corresponding document elements of the first plurality of document elements within the first layer of the graphical user interface as generated by the client device, including generating a translucent region with a color assigned to the author identifier, and displaying the overlay as the second layer over the first layer of the graphical user interface that represents the first plurality of document elements, including displaying the translucent region over a document content region of the graphical user interface that corresponds to the plurality of adjacent document elements.

2. The method of claim 1, wherein the method further comprises:

receiving, at the client device and from the data server in real-time, second document content information that corresponds to a second document element of the electronic document;

updating, by the client device, the graphical user interface to represent the second document element based on the second document content information; and updating, by the client device, the visual identifiers to indicate which of the first author identifiers corresponds to the second document element represented by the graphical user interface.

3. The method of claim 2, wherein the method further comprises:

receiving, by the client device, a second author identifier that indicates a most recent author for the second document element, wherein the second document content information and the second author identifier correspond to a second timestamp;

selecting, by the client device, a visual identifier for the second author identifier based on the graphical user interface;

maintaining, by the client device, a list of author identifiers that includes the first author identifiers and the second author identifiers; and updating, by the client device, the visual identifiers to indicate which of the first author identifiers and the second author identifier correspond to the document elements represented by the graphical user interface.

4. The method of claim 3, wherein the method further comprises:

generating an overlay that includes i) display names that correspond to the list of author identifiers, and ii) the visual identifiers that correspond to the display names; and displaying the overlay over the graphical user interface that represents the first plurality of document elements.

5. The method of claim 4, wherein:

updating the graphical user interface comprises generating the graphical user interface to represent the second document element the first plurality of document elements; and generating the overlay comprises generating the overlay to include i) display names that correspond to at least some of the first author identifiers, and ii) the visual identifiers that correspond to the at least some of the first author identifiers.

6. The method of claim 5, wherein the at least some of the first author identifiers correspond to document elements of the first plurality of document elements that are within a predetermined range of the second document element.

7. The method of claim 4, wherein:

updating the graphical user interface comprises generating the graphical user interface to omit representation of at least some of the first plurality of document elements; and generating the overlay comprises generating the overlay to include i) display names that correspond to at least some of the first author identifiers that are selected based on memory utilization of the client device, and ii) the visual identifiers that correspond to the at least some of the first author identifiers.

8. The method of claim 4, wherein the method further comprises sending a request, based on the list of author identifiers, for display names to a directory service device in response to receipt of the second document content information.

9. The method of claim 2, wherein:

the first plurality of document elements includes the second document element;

receiving the second document content information comprises locally caching i) the first document content information that corresponds to the second document element, and ii) the second document content information that corresponds to the second document element, and updating the second document element based on the second document content information; and the method further comprises, in response to a selection of the second document element by a user of the electronic document, generating an overlay that indicates the first document content information and the second document content information in a chronological order, and displaying the overlay over the graphical user interface.

10. The method of claim 1, wherein the first author identifiers identify i) a direct author that directly edited a first document element of the plurality of document elements, and ii) an indirect author that indirectly edited a second document element of the plurality of document elements.

11. A client device, comprising:

a non-transitory computer-readable memory;

a hardware processor that:

receives, from a data server, first document content information that corresponds to a first plurality of document elements of an electronic document, generates a first layer of a graphical user interface that represents the first plurality of document elements based on the first document content information, receives first author identifiers that indicate most recent authors for the first plurality of document elements, wherein the first document content information and the first author identifiers correspond to a first timestamp, selects visual identifiers for the first author identifiers based on the first layer of the graphical user interface as generated by the client device, and generates the visual identifiers to indicate which of the first author identifiers correspond to the first plurality of document elements represented by the graphical user interface;

wherein the hardware processor:

assigns a color to an author identifier of the first author identifiers, the author identifier corresponding to a most recent author of a plurality of adjacent document elements of the first plurality of document elements;

generates an overlay as a separate, second layer of the graphical user interface that includes the visual identifiers at locations of the corresponding document elements of the first plurality of document elements within the first layer of the graphical user interface as generated by the client device, wherein the overlay includes a translucent region with the color assigned to the author identifier;

displays the overlay as the second layer over the first layer of the graphical user interface that represents the first plurality of document elements; and displays the translucent region over a document content region of the graphical user interface that corresponds to the plurality of adjacent document elements.

12. The client device of claim 11, wherein the hardware processor:

receives, at the client device and from the data server in real-time, second document content information that corresponds to a second document element;

updates the graphical user interface to represent the second document element based on the second document content information; and updates the visual identifiers to indicate which of the first author identifiers correspond to the second document element represented by the graphical user interface.

13. The client device of claim 12, wherein the hardware processor:

receives a second author identifier that indicates a most recent author for the second document element, wherein the second document content information and the second author identifier correspond to a second timestamp;

selects a visual identifier for the second author identifier based on the graphical user interface;

maintains a list of author identifiers that includes the first author identifiers and the second author identifier; and updates the visual identifiers to indicate which of the first author identifiers and the second author identifier correspond to the document elements represented by the graphical user interface.

14. The client device of claim 13, wherein the hardware processor:

generates an overlay that includes i) display names that correspond to the list of author identifiers, and ii) the visual identifiers that correspond to the display names; and displays the overlay over the graphical user interface that represents the first plurality of document elements.

15. The client device of claim 14, wherein the hardware processor:

generates the graphical user interface to represent the second plurality of document elements, wherein the second plurality of document elements includes at least some of the first plurality of document elements; and generates the overlay to include i) display names that correspond to at least some of the first author identifiers, and ii) the visual identifiers that correspond to the at least some of the first author identifiers.

16. The client device of claim 14, wherein the hardware processor:

generates the graphical user interface to omit representation of at least some of the first plurality of document elements; and generates the overlay to include i) display names that correspond to at least some of the first author identifiers that are selected based on memory utilization of the client device, and ii) the visual identifiers that correspond to the at least some of the first author identifiers.

17. The method of claim 2, wherein selecting the visual identifiers comprises selecting the visual identifiers based on document elements that are predictively determined as likely to come into a viewable area of the graphical user interface.

18. The method of claim 17, further comprising:

maintaining a list of author identifiers for at least some document elements that are outside of the viewable area of the graphical user interface.

19. The method of claim 10, wherein the second document element of the plurality of document elements is a target element that is indirectly changed by a direct change by the indirect author to a source element that corresponds to the target element.

20. The method of claim 19, wherein the target element contains a link, formula, or calculation that references the source element.

* * * * *